US010089829B2

(12) United States Patent
Beyer

(10) Patent No.: US 10,089,829 B2
(45) Date of Patent: Oct. 2, 2018

(54) SPORTS BETTING MODEL

(71) Applicant: David M. Beyer, Gilbertsville, PA (US)

(72) Inventor: David M. Beyer, Gilbertsville, PA (US)

( * ) Notice: Subject to any disclaimer, the term of this patent is extended or adjusted under 35 U.S.C. 154(b) by 0 days.

(21) Appl. No.: 15/725,952

(22) Filed: Oct. 5, 2017

(65) Prior Publication Data

US 2018/0033251 A1 Feb. 1, 2018

Related U.S. Application Data

(63) Continuation-in-part of application No. 14/976,395, filed on Dec. 21, 2015.

(60) Provisional application No. 62/106,784, filed on Jan. 23, 2015.

(51) Int. Cl.
*G06F 17/00* (2006.01)
*G07F 17/32* (2006.01)
*G06Q 50/34* (2012.01)

(52) U.S. Cl.
CPC ......... *G07F 17/3288* (2013.01); *G06Q 50/34* (2013.01); *G07F 17/3223* (2013.01); *G07F 17/3244* (2013.01); *G07F 17/3272* (2013.01)

(58) Field of Classification Search
None
See application file for complete search history.

(56) References Cited

U.S. PATENT DOCUMENTS 6,347,086 B1 * 2/2002 Strachan ................ G06Q 50/34 370/389
2007/0232393 A1 * 10/2007 Dreyer .................. G06Q 10/06 463/29
2008/0113816 A1 * 5/2008 Mahaffey ................ G07F 17/32 463/42
2011/0098096 A1 * 4/2011 Odom .................... G06Q 40/00 463/17
2011/0281620 A1 * 11/2011 Hays .................... G07F 17/3288 463/2
2013/0079094 A1 * 3/2013 Odom .................... G07F 17/3288 463/17
2013/0084955 A1 * 4/2013 Davis .................... G07F 17/32 463/25
2013/0116032 A1 * 5/2013 Lutnick ............... G07F 17/3276 463/17
2013/0196753 A1 * 8/2013 Miller .................. G07F 17/3244 463/28
2014/0150007 A1 * 5/2014 Randall ............. H04N 21/4758 725/23

(Continued)

*Primary Examiner* — Paul A D'Agostino
(74) *Attorney, Agent, or Firm* — Lesley Ann Rhyne

(57) ABSTRACT

A sports betting system for creating and processing a sports betting entertainment for a plurality of sports bettors. The sports bettors select a plurality of sporting contests from the at least one sporting category. The sports bettors select at least one of the plurality of sports teams as a winning team in each of the plurality of sporting contests. The at least one of the plurality of sports bettors is selected as the won bettor when the plurality of sports teams selected by the at least one of the plurality of sports bettors has won in the plurality of sporting contests. The sports betting entertainment created by the sports betting system is derived from combining several sporting events from a specific category or specific categories into a single betting opportunity and requiring the bettor to successfully select the winner in a daily specified required number of contests.

21 Claims, 4 Drawing Sheets

(56) References Cited

U.S. PATENT DOCUMENTS

| | | | | |
|---|---|---|---|---|
| 2015/0050988 | A1* | 2/2015 | Nichols | H04L 63/107<br>463/25 |
| 2015/0080124 | A1* | 3/2015 | Andersen | G07F 17/3288<br>463/31 |
| 2016/0042612 | A1* | 2/2016 | Scalise | G07F 17/3288<br>463/25 |
| 2016/0210815 | A1* | 7/2016 | Holt | G07F 17/3244 |

* cited by examiner

SPORTS BETTING MODEL

BACKGROUND OF THE DISCLOSURE

Technical Field of the Disclosure

The present embodiment relates generally to sports betting models, and more particularly to a sports betting system that combines several sporting events from a specific category or specific categories into a single betting opportunity and that enables sports bettors to select winners from a multiple number of sports games.

Description of the Related Art

Sports, betting are a popular way of earning money in a gambling industry that provides entertainment and increased viewership to sports fans and spectators. In sports betting, the bettors predict game winners and place a wager on the outcome of the game. Generally, sports bets are of two types: fixed odds and tote odds. In fixed odds, the amount to be paid by the betting system is determined only at the time of wager. In tote odds, all the participating bets are pooled and the winning bets share the pool. Usually, in these conventional types of betting methods, the sports bets are placed prior to the start of an event. In addition to these methods, another type called "in-play betting" also has been very popular. The in-play betting process bets on an outcome after the commencement of an event. Exotic bet is another type of in-play betting which refers to a bet made on a situation that may or may not happen during the processing of an event. Yet another type of betting is arbitrage betting where each outcome of an event is bet upon so that a known profit is made by the bettor after the completion of the event, regardless of the outcome.

Sports betting is commonly conducted in sports like football, soccer, horse or dog racing, basketball and the like utilizing a telephone, interactive television Internet and smartphone applications. With the advent of internet technology and other electronic distribution methods, online sports betting, methods have become very popular in the interactive gaming markets. The online sports betting methods are designed to be more interactive which enables the customers to gamble with joysticks and controls. Certain sports betting models even help the government to collect taxes from the betting organizers and winners. These smarter money betting methods are customized as simple and thrilling depending upon the type of audience. The simple sports betting models are very easy to play and are more suitable for the casual bettor who participates in sports gambling for relaxation rather than for thrills.

A wide variety of methods have been developed to facilitate the sports betting process. For example, one method describes a system that creates virtual events within a virtual world. A virtual event may be akin to a real event, but is completely computer generated within a computer-generated world and is based on statistical measures, either real world or created. Numerous characteristics about the competitors and the competition location parameters are available before a competition event. Based on the known parameters about the location of an event and the characteristics of the participants and their historical past performances in similar events enable bettors to make informed wagers on an event that greatly enhances the satisfaction and involvement in a competition event. However, this method, demands specialized knowledge for a sports bettor on various sports gaming aspects like points, dollars, runs, or goals, to succeed in this sports betting process.

Another method describes a system for enabling a fantasy sports betting system with a server for transmitting odds, displays and results data; a memory device that receives and stores user input and sporting event outcome data in a non-transitory computer readable medium; and a processor that processes user input and sporting event outcome data according to at least one game of the system. However, this system does not provide a second betting chance for picking a sports team if the first chance failed because of technical issues in the system, or a natural calamity.

Yet another method describes a sport and event wagering system. This system allows pari-mutuel wagering with respect to new areas other than horse or dog racing, expanding the sports wagering industry to encompass other areas of interest and enjoyment to bettors. Specifically, pari-mutuel wagering is enabled with respect to the performance statistics of individual sport or event participants, combinations of sport participants, combinations of event participants, and sports teams. However, this sports and event wagering system only allows a sport bettor to predict winners from one sporting contest which can result in smaller payouts to the bettor.

Another betting method exists in which a sports bettor picks a single digit integer, or number from "0" to "9". Predetermined criterion numbers are summed and the least significant digit of the sum is compared to the selected integer to determine winners. The system includes adding the numerical values of the numbers of the winning positions of the entrants (typically first, second and third), with the least significant digit of the sum or total being compared with the bettor's selected number. However, this betting method is difficult to understand, so a sports bettor with substantial knowledge of the sporting events may not be able to bet effectively and successfully.

Therefore, there is a need for a sports betting method that is easy to understand for a sports bettor with limited knowledge of the sporting events involved. Such a needed method would allow a sports bettor to predict winners from a multiple number of sporting contests providing potentially larger payouts to the bettors. Further, such a needed method would provide a free credit for selecting winning sports teams to a bettor if the first bet failed because of technical issues or a natural calamity. Such a needed method would attract increased interest of sports bettors and spectators. Moreover, such a needed method would allow the sports betting houses to balance the spotting contests without spending much time and money. Such a needed method would be deployed via Internet in a manner that extends the reach of the sports betting houses. Furthermore, such a needed method would not charge a betting fee or a commission due to its higher profit margins. The present embodiment accomplishes these objectives.

SUMMARY OF THE DISCLOSURE

To minimize the limitations found in the prior art, and to minimize other limitations that will be apparent upon the reading of the specification, the preferred embodiment of the present invention provides a sports betting system and a method for creating and processing a sports betting entertainment for a plurality of sports bettors. The sports betting system comprises a processor having a bet processing module and a memory unit integrated with a sports betting database. The memory unit is coupled with the processor. A count of daily contests to be conducted on a specific day is determined by each of the plurality of sports bettors. Computer-executable instructions on the processor provides the plurality of sports bettors with counts of varied sports contests with their payouts that can range from selecting a count from three sports contests, selecting counts from several different three sports contests, from selecting a count from four sports contests, selecting counts from several different four sports contests, from selecting a count from five sports contests, selecting counts from several different five sports contests, or from selecting a count from six or more sports, contests. The plurality of sports bettors can daily select one or more counts, which could be a selection of a three sports contests count, of two different three sports contests counts, of a five sports contests count, and a nine sports contests count the same day or in the future. Computer-executable instructions on the processor will examine daily all previously offered and transmitted counts and all other sports contests with their payouts, and may change the previously offered and transmitted sports contests within the various counts. For all future individual counts, computer-executable instructions on the processor will calculate daily the payouts based on current available informational input. Computer-executable instructions on the processor will access and store daily information that will be obtained from the up to top fifty sports betting websites listing the sports contests betting odds, dollars, points, runs, and goals, and other sports betting information such as player contract negotiations, player injury reports, player personal issues, and contest site weather changes daily for all future sporting contests of pro football, college football, pro baseball, pro hockey, pro soccer, pro basketball, and college basketball. Computer-executable instructions on the processor will calculate and store daily the weighed aggregate averages of all sports contests betting odds, dollars, points, runs, and goals, and for all sports betting contest information for all counts, for pro football, college football, pro baseball, pro hockey, pro soccer, pro basketball, and college basketball. Computer-executable instructions on the processor will prioritize and then recommend daily the most profitable count offerings for us to our retail customers who can bet on our website and to our clients, i.e. websites, states, and casino corporations. Computer-executable instructions on the processor will prioritize and select daily those sports contests for the various counts that are the most competitively calculated, that have the smallest number of points, dollars, runs, or goals separating the favored sports teams from the underdog sports teams. Depending on the prioritized recommendations from computer-executable instructions on the processor, the varied offered counts of sports contests may vary from our retail customers and to our clients, i.e. websites, states, and casino corporations. The number of selectable sports contests offered daily in the varied counts to retail customers who can bet on our website and to clients, i.e. websites, states, and casino corporations may often exceed the number of mandatory required sports contests picks for those counts. For all possible permutations and combinations of individual counts, computer-executable instructions on the processor will calculate daily the payouts based on current available informational input from the up to top 50 sports betting websites listing the sports contests betting odds, dollars, points, runs, and goals, and other sports betting information such as player contract negotiations, player injury reports, player personal issues, and contest site weather changes daily for all future sporting contests of pro football, college football, pro baseball, pro hockey, pro soccer, pro basketball, and college basketball.

The sports betting system enables the plurality of sports bettors to select at least one sporting category utilizing a web based betting platform installed on an electronic device. The plurality of sports bettors selects the at least one sporting category via a network. The plurality of sports bettors selects the plurality of sporting contests from the at least one sporting category. The plurality of sports bettors is allowed to select the plurality of sporting contests from the at least one sporting category daily. When the plurality of sports teams from several different categories are combined, numerous different betting opportunities are concurrently offered.

A count of daily contests to be conducted, from the selected groups of sports contests on, a specific day, is determined by each of the plurality of sports bettors. A plurality of sports bets is placed by the plurality of sports bettors via the web based betting platform. This is achieved by selecting at least one of the plurality of sports teams as a winning team in each of the plurality of sporting contests by the plurality of sports bettors. The at least one sporting category, the plurality of sporting contests, the count of daily contests and the plurality of sports bets are stored at the sports betting database. The plurality of sports bettors submits the plurality of sports bets placed by each of the plurality of sports bettors to the bet processing module at the processor via the web based betting platform before the commencement of the plurality of sporting contests. The bet processing module accepts the plurality of sports bets. The bet processing module rejects the at least one of the plurality of sports bets if the plurality of sports bettors had submitted the plurality of sports bets after the commencement of the plurality of sporting contests.

The specified number of daily contests is conducted within planned time duration in real time outside the sports betting system. After the completion of the plurality of sporting contests, results of the plurality of sports teams are informed via the network by the bet processing module to each of the plurality of sports bettors. The plurality of sports bets is retrieved from the sports betting database to determine the at least one won bettor. The results of the plurality of sports teams are compared with the plurality of sports bets submitted by each of the plurality of sports bettors. Finally, the at least one of the plurality of sports bettors is selected as the won bettor when the plurality of sports teams, selected by the at least one of the plurality of sports bettors has won in the plurality of sporting contests. If all the sports teams predicted by the at least one of the plurality of sports bettors become the winners in all the sporting contests then those sports bettors becomes the winner in the sports betting method. Preferably, the web based betting platform selects the at least one won bettor without any handicapping points, goals, runs, or dollars. The at least one won bettor is rewarded with payments by the bet processing module via the web based betting platform. The bet processing module declares the selection of the at least one won bettor as incorrect when at least one of the plurality of sporting contests ends in a tie. If in the sporting contests of pro soccer where the result of the sporting contest is a tie and the plurality of sports bettors picked a sports team to have won the sporting contest, the tie pick will be considered a losing pick.

The sports bettors whose predicted sports teams got failed in the sporting contests become non-winning bettors. The bet processing module rejects payments to the non-winning bettors. In the preferred embodiment, the successful sports bettors win large payouts for a small bet. Further, the sports betting houses do not have to spend as much time and money in balancing the sporting contests. Due to higher profit margins, the sports betting houses do not have to charge a betting fee or a commission, which encourages more fan bets.

The preferred system and method allows the participant to pick only winning teams daily from Sunday through Saturday as long as there are enough competitive sporting contests to offer choices daily in a specific category or specific categories. The sports betting model is the creation and processing of a betting opportunity derived from combining several sporting events from a specific category or specific categories into a single betting opportunity and, requiring the bettor to successfully pick the winner in a daily specified required number of contests.

One added advantage of the preferred embodiment is that, the method provides a free credit for picking winning sports teams to a sports bettor if the first chance of winner prediction got failed in case of natural calamity such as rainout, national emergency, lighting failure, earthquakes, fires or floods, a sports bettor would then receive a free credit to select the at least one of the sports teams.

In accordance with another exemplary embodiment of the present invention, a non-transitory computer-readable medium comprises computer-executable instructions stored therein for causing a computer to implement a program executable on, a sports betting system for creating and processing a sports betting entertainment for a plurality of sports bettors.

A first objective of the present invention is to provide a sports betting system that is easy to understand for a sports bettor with limited knowledge of the sporting contests involved.

A second objective of the present invention is to provide a sports betting system that allows a sports bettor to predict winners from a multiple number of sporting contests providing potentially larger payouts to the bettors.

A third objective of the present invention is to provide a sports betting system that provides a free credit for picking winning sports teams to a bettor if the first bet failed because of technical issues or a natural calamity.

A fourth objective of the present invention is to provide a sports betting system that attracts increased interest of sports bettors and spectators.

A fifth objective of the present invention is to provide a sports betting system that allows the sports betting houses to balance the sporting contests without spending much time and money.

A sixth objective of the present invention is to provide a sports betting system deployed via Internet in a manner that extends the reach of the sports betting houses.

A seventh objective of the present invention is to provide a sports betting system that does not charge a betting fee or a commission due to its higher profit margins.

An eighth objective of the present invention is to provide a sports betting system that will encourage more fan bets.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1:
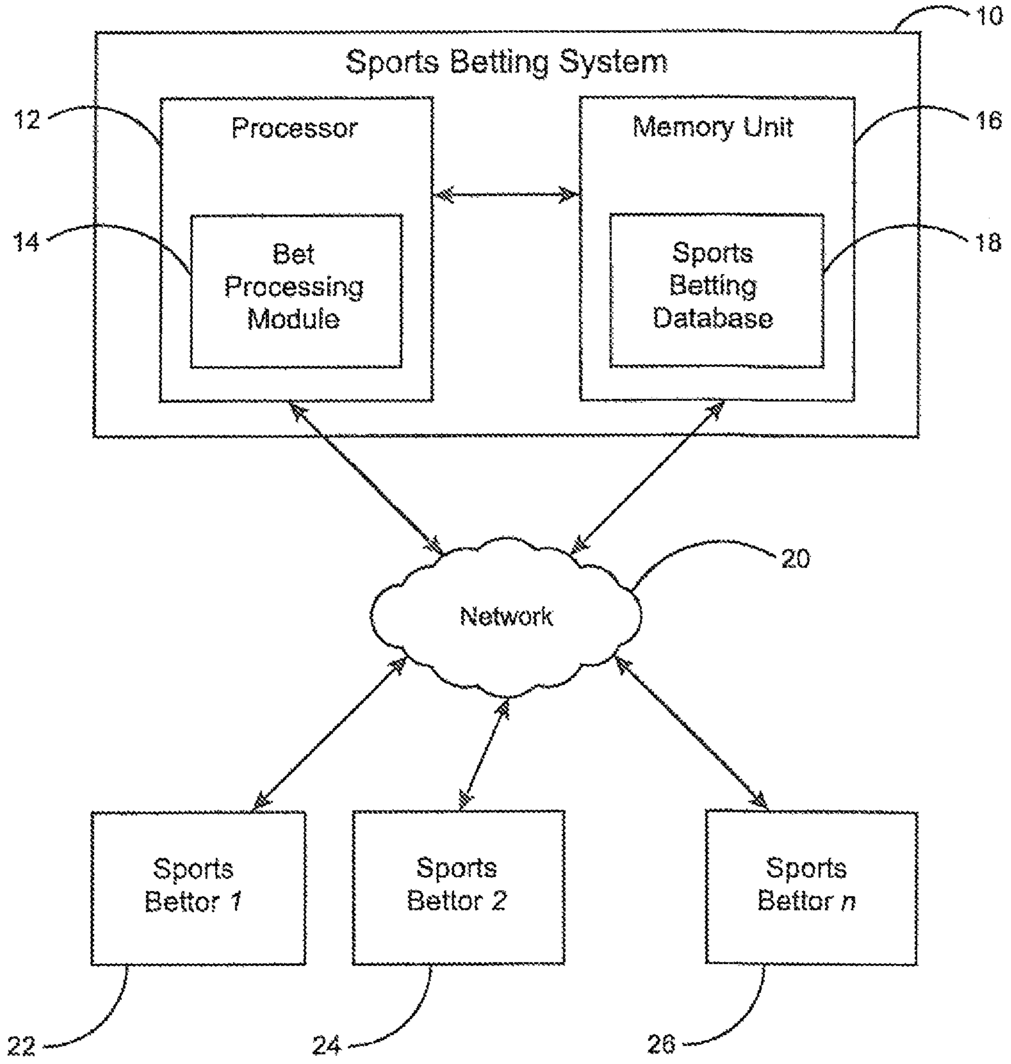
FIG. 1 illustrates a high level block diagram of a sports betting system for creating and processing a sports betting entertainment for a plurality of sports bettors in accordance with an embodiment of the present invention.
Figure 2:
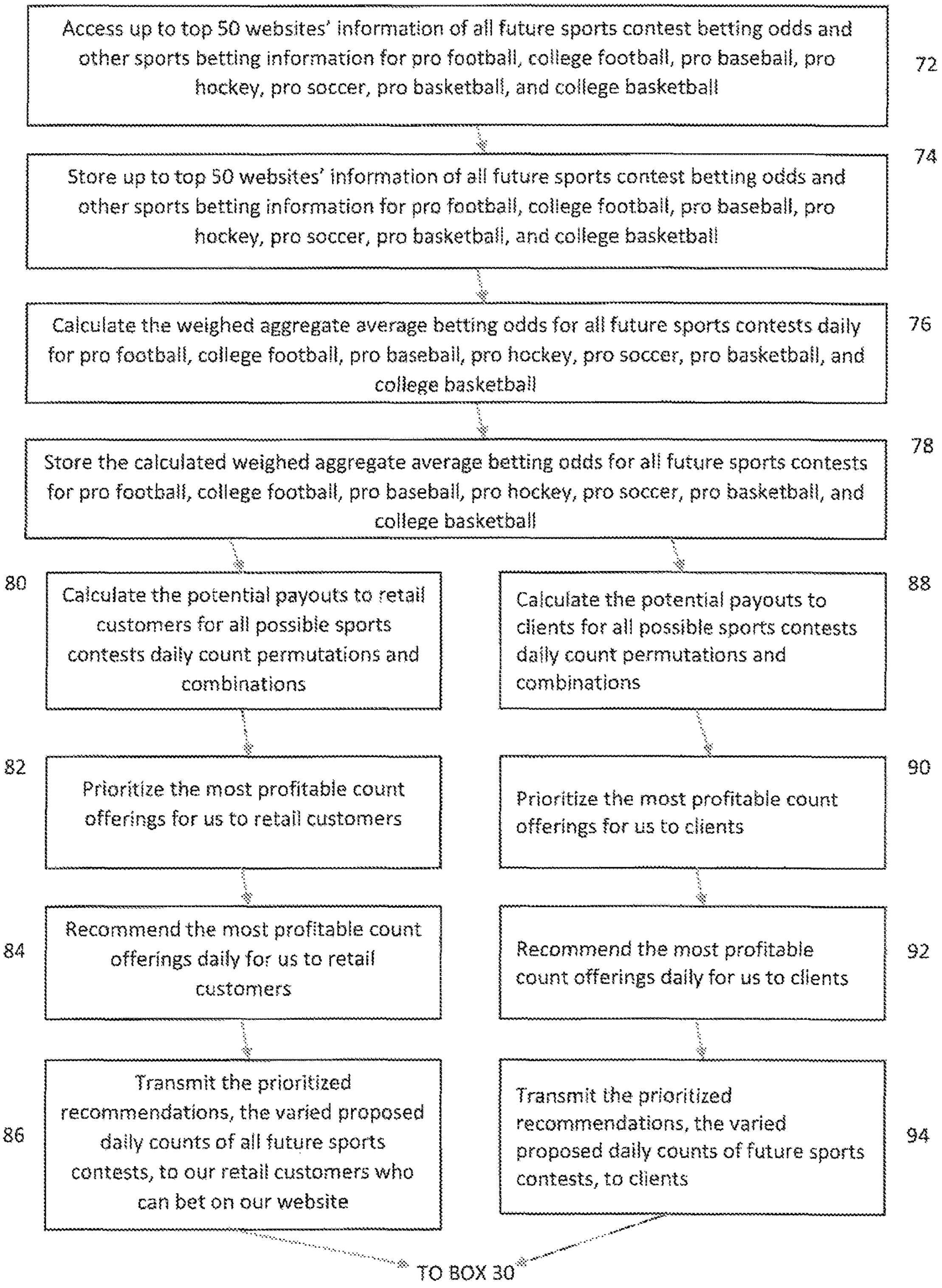
FIG. 2 illustrates high level flowchart of a method for creating and processing the sports betting entertainment for the plurality of sports bettors utilizing the sports betting system.
Figure 3:
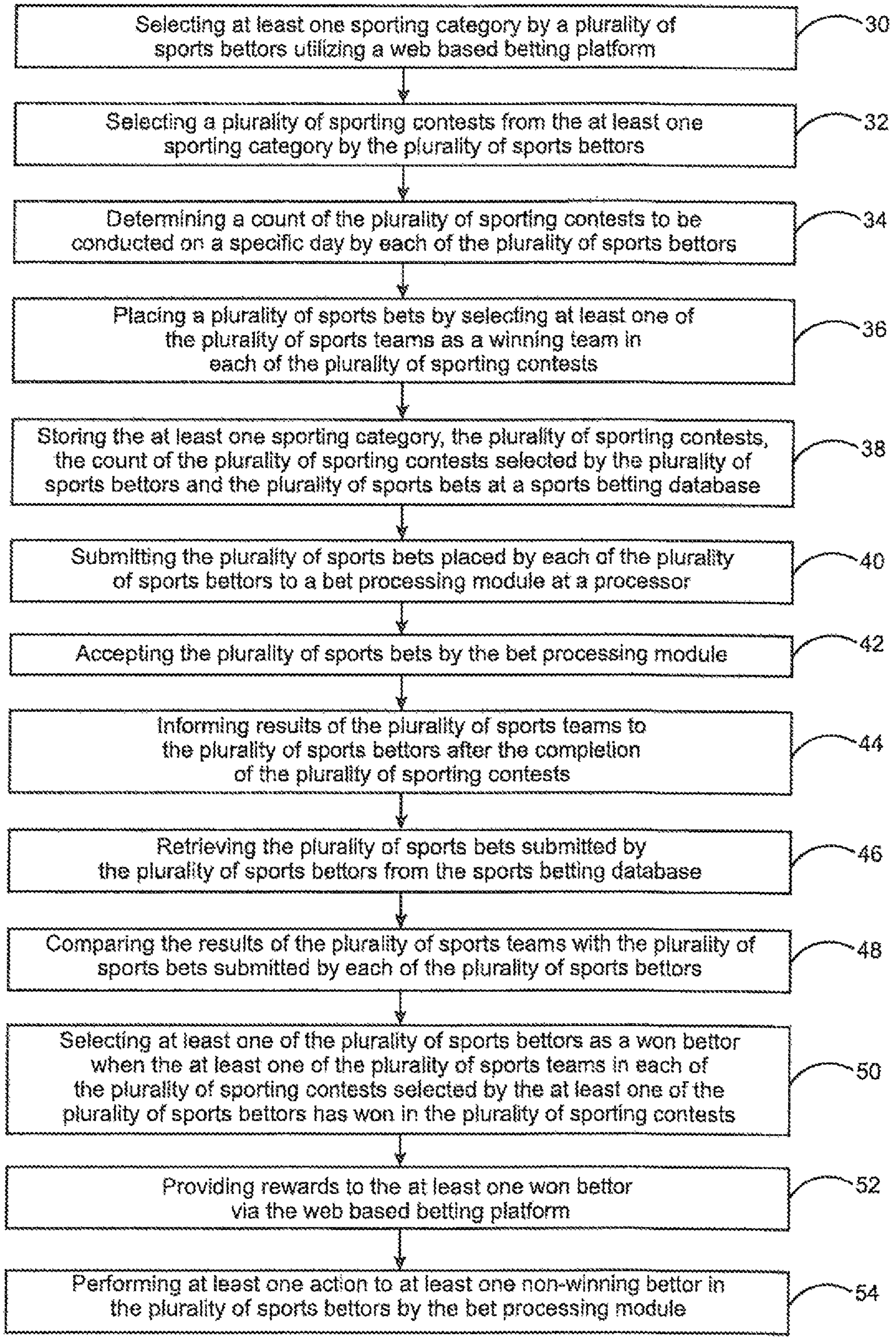
FIG. 3 illustrates high level flowchart of a method for creating and processing the sports betting entertainment for the plurality of sports bettors utilizing the sports betting system.

Referring to FIG. 1 of the drawings, a sports betting system for creating and processing a sports betting entertainment for a plurality of sports bettors according to the present invention is illustrated and generally designated by the reference numeral 10. The sports betting system 10 comprises a processor 12 having a bet processing module 14 and a memory unit 16 integrated with a sports betting database 18. The memory unit 16 is coupled to the processor 12. The preferred sports betting system 10 enables the plurality of sports bettors to select at least one sporting category utilizing a web based betting platform installed on an, electronic device via a network 20. The sports betting system 10 is adaptable to provide betting service to any number of plurality of sports bettors represented as sports bettor1 22, sports bettor2 24 up to sports bettor-n (n=unlimited number of bettors) 26 as illustrated in FIG. 1. The plurality of sports bettors selects a plurality of sporting contests from the at least one sporting category. The at least one sporting category includes pro football, college football, pro basketball, college basketball, pro baseball, pro soccer and pro hockey. Each of the plurality of sporting contests includes a plurality of sports teams. The sports bettors 22, 24 and 26 select their favorite sports teams through the electronic device. The electronic device is selected from a group consisting of a smart phone, a laptop, a personal computer, a tablet computing device, a hand-held digital media communication device, or any future communication device. Referring to FIG. 2 and FIG. 3, a method for creating and processing the sports betting entertainment is illustrated. Computer-executable instructions on the processor will access and store the daily up to top fifty websites' information of the betting odds on sports contests for pro football, college football, pro baseball, pro hockey, pro soccer, pro basketball, and college basketball, and sports betting information such as player contract negotiations, player injury reports, player personal issues, and contest site weather changes for the next thirty days as shown in blocks 72 and 74. Computer-executable instructions on the processor will calculate as shown in block 76 and store as indicated in block 78 the weighed aggregate average daily betting odds for all sports contests based on current available informational input for the next thirty days. For all possible permutations and combinations of individual counts of pro football, college football, pro baseball, pro hockey, pro soccer, pro basketball, and college basketball, computer-executable instructions on the processor will calculate the daily payouts based on current available informational input from the up to top fifty sports betting websites listing the sports contests betting odds, dollars, points, runs, and goals, and other sports betting information such as player contract negotiations, player injury reports, player personal issues, and contest site weather changes to our retail customers for the next thirty days as indicated in block 80 and to our clients i.e. websites, states, and casino corporations as in indicated in block 88. To indicate the betting odds, runs may be used for baseball, goals may be used for soccer and hockey, points maybe used for basketball and football, and dollars maybe used for all of the above-mentioned sports betting categories.

The number of selectable sports contests recommended in the varied counts to retail customers and to clients, i.e. websites, states, and casino corporations, may often exceed the number of mandatory required, sports contests picks for those counts. Computer-executable instructions on the processor will, prioritize the most profitable daily count offerings for us to our retail customers who can bet on our website as indicated in block 82 and to our clients, i.e. websites, states, and casino corporations as indicated in block 90. Computer-executable instructions on the processor will recommend the most profitable daily count offerings for us to our retail customers as indicated in block 84 and to our clients, i.e. websites, states, and casino corporations as indicated in block 92. Computer-executable instructions on the processor will prioritize and select daily those sports contests for the various counts that are the most competitively calculated weighed aggregate averages, which have the smallest number of points, dollars, runs, or goals separating the favored sports teams from the underdog, sports teams. Depending on the prioritized recommendations from computer-executable instructions on the processor, the varied offered counts of sports contests may vary for our retail, customers and our clients, i.e. websites, states, and casino corporations. The prioritized recommendations from computer-executable instructions on the processor, the varied offered daily counts of sports contests, will be transmitted to our retail customers as indicated in block 86 and our clients, i.e. websites, states, and casino corporations as indicated in block 94.

Referring to FIG. 3, as shown in block 30, the plurality of sports bettors selects the at least one sporting category utilizing the web based betting platform via the network. Next, the plurality of sporting contests from the at least one sporting category is selected by the plurality of sports bettors as shown in block 32. In the preferred embodiment, the plurality of sports bettors is allowed to select the plurality of sporting contests from the at least one sporting category daily for the next thirty days.

A count of daily contests, from the selected groups of sports contests, to be conducted on a specific day, is determined by each of the plurality of sports bettors as indicated at block 34. Thereafter, a plurality of sports bets is placed by the plurality of sports bettors via the web based betting platform as shown in block 36. This is achieved by selecting at least one of the plurality of sports teams as a winning team, in each of the plurality of sporting contests by the plurality of sports bettors. When the plurality of sports teams from several different categories are combined, numerous different betting opportunities are concurrently offered. Next, the at least one sporting category, the plurality of sporting contests, the count of daily contests and the plurality of sports bets are stored at the sports betting database as indicated at block 38. The plurality of sports bettors submits the plurality of sports bets placed by each of the plurality of sports bettors the bet processing module at the processor via the web based betting platform before to the commencement of the plurality of sporting contests, as indicated at block 40. The bet processing module accepts the plurality of sports bets as shown in block 42. The bet processing module rejects the at least one of the plurality of sports bets if the plurality of sports bettors had submitted the plurality of sports bets after the commencement of the plurality of sporting contests.

The specified number of daily contests is conducted within planned time duration in real time outside the system 10. As indicated at block 44, after the completion of the plurality of sporting contests, results of the plurality of sports teams are informed via the network by the bet processing module to each of the plurality of sports bettors. Next step is to determine at least one won bettor winner among the plurality of sports bettors. In order to determine the at least one won bettor, the plurality of sports bets is retrieved from the sports betting database as shown at block 46. Thereafter, the results of the plurality of sports teams are compared with the plurality of sports bets submitted by each of the plurality of sports bettors as indicated at block 48. Finally, the at least one of the plurality of sports bettors is selected as the won bettor when the plurality of sports teams selected by the at least one of the plurality of sports bettors has won in the plurality of sporting contests as shown in block 50. To be more clear, if all the, sports teams predicted by the at least one of the plurality of sports bettors become the winners in all of the sporting contests then those sports bettors becomes the winner in the sports betting method. The web based betting platform selects the at least one won bettor without any handicapping points, goals, runs, or dollars. The at least one won bettor is rewarded with payments by the bet processing module via the web based betting platform as shown in block 52. In one embodiment of the present invention, the rewards may be gift vouchers, entry tickets for tour packages and sports events, special discounts for various products, services in malls and supermarkets, or gifts to charities, cash, and amounts processed to credit cards. The sports bettors whose predicted sports teams failed in the sporting contests become non-winning bettors. The bet processing module performs at least one, action to the non-winning bettors as indicated at block 54. The at least one action includes rejecting the rewards to the non-winning bettors.

The bet processing module declares the selection of the at least one won bettor as incorrect when at least one of the plurality of sporting contests ends in a tie. If in the sporting contests of pro soccer where the result of the sporting contest is a tie and the plurality of sports bettors picked a sports team to have won the sporting contest, the tie pick will be considered a losing pick.

One added advantage of the preferred embodiment is that, the method provides a free credit for picking winning sports teams to a sports bettor if the first chance of winner prediction got failed in case of natural calamity such as rainout, national emergency, lighting failure, earthquakes, fires or floods, a participant would then receive a free credit for another selection to select the at least one of the sports teams or another bet on a potential winning sports team. This free credit can be used within thirty days from the date of the canceled contest or the opportunity to pick again is lost.

Figure 4:
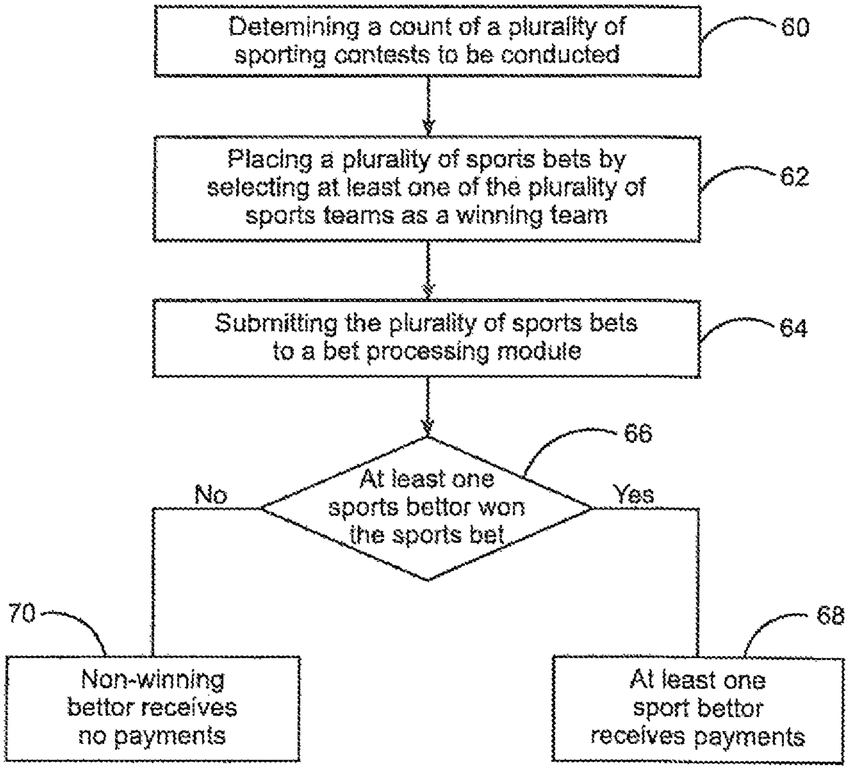
FIG. 4 illustrates a flowchart for selecting at least one of the plurality of sports bettors as a won or non-winning bettor.

FIG. 4 illustrates a method for selecting the at least one of the plurality of sports bettors as the won or non-winning bettor. As shown in block 60 the count of daily contests, from the selected groups of sports contests, to be conducted on a specific day, is determined by each of the plurality of sports bettors. The plurality of sports bettors places the plurality of sports bets by selecting the at least one of the plurality of sports teams as the winning team as illustrated at block 62. The plurality of sports bets is submitted to the bet processing module as shown in block 64. The sports bets should be submitted before the commencement of the actual sporting contents. If any sports bet failed to submit before the commencement of the sporting contest then that sports bet is not allowable and gets rejected by the bet processing module. A visualization of allowable bets is made available to potential bettors and a plurality of sports betting houses. These visualizations include, but are not limited to, printed media with a list of allowable bets and an Internet interface showing allowable bets.

Thereafter, the system 10 performs a check to determine whether the at least one sports bettor has won the sports bet or not as shown in block 66. If the plurality of sports teams selected by the at least one of the plurality of sports bettors has won in the plurality of sporting contests then those sports bettors become the winners. These won bettors receive rewards in the form of payments from the bet processing module as shown in block 68. If any of the selected sports teams fail then the corresponding sports bettors become non-winning bettors and receive no payments as indicated at block 70.

In the preferred sports betting system 10, the successful sports bettors win large payouts for a small bet. Further, the sports betting houses do not have to spend as much time and money in balancing the sporting contests. Due to higher profit margins, the sports betting houses do not have to charge a betting fee or a commission, which encourages more fan bets. The simplicity of the invention allows it to be deployed via the Internet in a manner that extends the reach of the sports betting houses.

Table 1 represents betting possibilities of a selection of six sports contests in a count. It is one of many computer executable instructions on the processor which will help to calculate the daily sports contest betting odds and the sports bettor payouts based on current available informational input from the up to top 50 sports betting websites listing the sports contests betting odds, dollars, points, runs, and goals, and other sports betting information such as player contract negotiations, player injury reports, player personal issues, and contest site weather changes for the next thirty days. Although the specific embodiment states the present invention repeats, calculates, continues, assesses and/or offers daily for the next thirty days any number of days is contemplated under the present invention. A sample representation of total chance of favorite teams winning is also shown in below Table 1.

TABLE 1

| Bets | First Contest 25% 1 | Second Contest 25% 3 | Third Contest 25% 7 | Fourth Contest 25% 15 | Fifth Contest 10% 31 | Sixth Contest 10% 63 | Total Chance of Favorites Not Winning 120 | Payout 6 to 1 |
|---|---|---|---|---|---|---|---|---|
| 1 | 0.25 | 0.75 | 1.75 | 3.75 | 3.10 | 6.30 | 15.90 | 6 |
| 2 | 0.00 | 0.50 | 1.50 | 3.50 | 3.00 | 6.20 | 14.70 | 6 |
| 3 | 0.00 | 0.25 | 1.25 | 3.25 | 2.90 | 6.10 | 13.75 | 6 |
| 4 | 0.00 | 0.00 | 1.00 | 3.00 | 2.80 | 6.00 | 12.80 | 6 |
| 5 | 0.00 | 0.00 | 0.75 | 2.75 | 2.70 | 5.90 | 12.10 | 6 |

If a sports bettor chases all six slightly favored teams, the odds of the bettor winning this bet will be 15.90 to 1, where it is calculated that, four of the slightly favored teams win three out of four contests and two of the slightly favored teams win nine out of ten contests. With the planned payout to winning participants of $6.00 for a $1.00 bet, the anticipated profit margin would be 9.90/15.90=62.26%.

In one embodiment, a non-transitory computer-readable medium comprises computer-executable instructions stored therein for causing a computer to implement a program executable on a sports betting system 10 for creating and processing a sports betting entertainment for a plurality of sports bettors. The non-transitory computer readable storage medium comprises a USB memory, CD-ROM, flexible disc, DVD, portable hard drive or a flash memory. In one embodiment, a non-transitory computer-readable medium, comprises computer-executable instructions, stored therein for causing mobility solutions to implement a program executable on a sports betting system 10 to create and process a sports betting entertainment for a plurality of sports bettors.

The foregoing description of the preferred embodiment of the present invention has been presented for the purpose of illustration and description, it is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. A method for creating and processing a sports betting entertainment for a plurality of sports bettors utilizing a sports betting system residing on a computer having a processor coupled with a memory unit integrated with a sports betting database via a network, the method comprising the steps of:

(a) accessing daily up to fifty websites' information of betting odds on sports contests for pro football, college football, pro baseball, pro hockey, pro soccer, pro basketball, and college basketball, and sports betting information;

(b) storing the daily up to top fifty websites' information of the betting odds on sports contests for pro football, college football, pro baseball, pro hockey, pro soccer, pro basketball, and college basketball, and sports betting information;

(c) calculating the weighed aggregate average daily betting odds on sports contests for pro football, college football, pro baseball, pro hockey, pro soccer, pro basketball, and college basketball, based on current available informational input;

(d) storing the weighed aggregate average daily betting odds on sports contests based on current available informational input;

(e) calculating, for all possible permutations and combinations of individual counts, the daily payouts based on current available informational input from the up to top fifty sports betting websites' sports contests betting odds, dollars, points, runs, and goals, and other sports betting information;

(f) prioritizing daily the most profitable count offerings;

(g) recommending daily the most profitable count offerings;

(h) prioritizing and selecting sports contests daily for the various counts that have the most competitively calculated weighed aggregate averages, which have the smallest number of points, dollars, runs, or goals separating the favored sports teams from the underdog sports teams;

(i) transmitting prioritized recommendations of the daily varied proposed counts of sports contests with their payouts;

(j) selecting at least one sporting category by the plurality of sports bettors utilizing a web based betting platform installed on an electronic device;

(k) selecting a plurality of sporting contests from the at least one sporting category by the plurality of sports bettors, each of the plurality of sporting contests includes a plurality of sports teams;

(l) determining a count of daily contests, the number of selectable groups of sports contests, to be conducted on a specific day by each of the plurality of sports bettors;

(m) placing a plurality of sports bets by selecting at least one of the plurality of sports teams as a winning team in each of the plurality of sporting contests by the plurality of sports bettors via the web based betting platform;

(n) storing the at least one sporting category, the plurality of sporting contests, the count of daily contests selected by the plurality of sports bettors and the plurality of sports bets at the sports betting database;

(o) submitting the plurality of sports bets placed by each of the plurality of sports bettors to a bet processing module at the processor via the web based betting platform by the plurality of sports bettors before the commencement of the plurality of sporting contests;

(p) accepting the plurality of sports bets by the bet processing module;

(q) informing results of the plurality of sports teams to the plurality of sports bettors after the completion of the plurality of sporting contests via the network by the bet processing module;

(r) retrieving the plurality of sports bets submitted by the plurality of sports bettors from the sports betting database;

(s) comparing the results of the plurality of sports teams with the plurality of sports bets submitted by each of the plurality of sports bettors;

(t) selecting at least one of the plurality of sports bettors as a won bettor when the at least one of the plurality of sports teams in each of the plurality of sporting contests selected by the at least one of the plurality of sports bettors at step (s) has won in the plurality of sporting contests;

(u) providing rewards to the at least one won bettor via the web based betting platform; and (v) performing at least one action to at least one non-winning bettor in the plurality of sports bettors by the bet processing module;

whereby the bet processing module provides an opportunity for the plurality of sports bettors to earn higher payoffs through the selection of a multiple number of winning teams in the plurality of sporting contests.

2. The method of claim 1 wherein the steps of (a)-(v) are performed at least daily for the next thirty days.

3. The method of claim 1 wherein the at least one action at step (v) includes rejecting payments to the at least one non-winning bettor when the plurality of sports teams selected by the at least one non-winning bettor did not win in the plurality of sporting contests.

4. The method of claim 1 wherein the web based betting platform selects the at least one won bettor without any handicapping points, goals, runs, or dollars.

5. The method of claim 1 wherein the bet processing module declares the selection of the at least one won, bettor as a losing pick when at least one of the plurality of sporting contests ends in a tie.

6. The method of claim 1 wherein the bet processing module declares the selection of the at least one won bettor in sporting contests of pro soccer as a winning pick where the result of the sporting contest is a tie.

7. The method of claim 1 wherein the bet processing module rejects the at least one of the plurality of sports bets if the plurality of sports bettors submits the plurality of sports bets after the commencement of the plurality of sporting contests.

8. The method of claim 1 wherein the electronic device is selected from a group consisting of: a smart phone, a laptop, a personal computer, a tablet computing device, a hand-held digital media communication device, and any future communication device.

9. A sports betting system for creating and processing a sports betting entertainment for a plurality of sports bettors, the sports betting system comprises:

a processor having a bet processing module; and a memory unit coupled with the processor and a sports betting database, the memory unit stores instructions which when executed directs the processor to:

access daily up to fifty websites' information of the betting odds on sports contests for pro football, college football, pro baseball, pro, hockey, pro soccer, pro basketball, and college basketball, and sports betting information;

store the daily up to fifty websites' information of the betting odds on sports contests for pro football, college football, pro baseball, pro hockey, pro soccer, pro basketball, and college basketball, and, sports betting information;

calculate the weighed aggregate average daily betting odds on sports contests of pro football, college football, pro baseball, pro hockey, pro soccer, pro basketball, and college basketball based on current available informational input;

store the weighed aggregate average daily betting odds on sports contests based on current available informational input;

calculate for all possible permutations and combinations of individual counts, for the daily payouts based on current available informational input from the up to top fifty sports betting websites' sports contests betting odds, dollars, points, runs, and goals, and other sports betting information;

calculate a number of selectable sports contests recommended in the varied counts to retail customers and to clients that may often exceed the number of mandatory required sports contests picks for those counts;

prioritize the most profitable count, offerings daily;

prioritize and select all, of those future sports contests daily of pro football, college football, pro baseball, pro hockey, pro soccer, pro basketball, and college basketball for the various counts that are the most competitively calculated weighed aggregate averages, which have the smallest number of points, dollars, runs, or goals separating the favored sports, teams from the underdog sports teams;

recommend the most profitable count offerings daily;

propose varied counts of sports contests which may vary for retail customers and clients;

propose a number of selectable sports contests in the varied counts to retail customers and to clients, that may be different and may often exceed the number of mandatory required sports contests picks for that count;

enable the plurality of sports bettors to select at least one sporting category utilizing, a web based betting platform installed on an electronic device;

enable each of the plurality of sports bettors to select a plurality of sporting contests from the at least one sporting category, each of the plurality of sporting contests includes a plurality of sports teams;

enable the count of daily contests, the number of selectable groups of sports contests, to be conducted on a specific day by each of the plurality of sports bettors;

enable the plurality of sports bettors to place a plurality of sports bets by selecting at least one of the plurality of sports teams as a winning team in each of the plurality of sporting contests via the web based betting platform;

store the at least one sporting category, the plurality of sporting contests, the count of daily contests selected by the plurality of sports bettors and the plurality of sports bets at a sports betting database integrated in the memory unit via a network;

allow the plurality of sports bettors to submit the plurality of sports bets placed by each of the plurality of sports bettors to the bet processing module via the web based betting platform by the plurality of sports bettors before the commencement of the plurality of sporting contests;

enable the bet processing module to accept the plurality of sports bets;

enable the bet processing module to inform results, of the plurality of sports teams to the plurality of sports bettors after the completion of the plurality of sporting contests via the network;

enable the bet processing module to retrieve the plurality of sports bets submitted by the plurality of sports bettors from the sports betting database;

allow the bet processing module to compare the results of the plurality of sports teams with the plurality of sports bets submitted by each of the plurality of sports bettors;

allow the bet processing module to select at least one of the plurality of sports bettors as a won bettor when the at least one of the plurality of sports teams in each of the plurality of sporting contests selected by the at least one of the plurality of sports bettors has won in the plurality of sporting contests;

enable the bet processing module to provide rewards to the at least one won bettor via the web based betting platform; and enable the bet processing module to perform at least one action to at least one non-winning bettor in the plurality of sports bettors;

whereby the bet processing module provides an opportunity for the plurality of sports bettors to earn higher payoffs through the selection, of a multiple number of winning teams in the plurality of sporting contests.

10. The sports betting system of claim 9 wherein the at least one action includes rejecting payments to the at least one non-winning bettor when the plurality of sports teams selected by the at least one non-winning bettor did not win in the plurality of sporting contests.

11. The sports betting system of claim 9 wherein the web based betting platform selects the at least one won bettor without any handicapping points, goals, runs, or dollars.

12. The sports betting system of claim 9 wherein the bet processing module declares the selection of the at least one won bettor as a losing pick when at least one of the plurality of sporting contests ends in a tie.

13. The sports betting system of claim 9 wherein the bet processing module declares the selection of the at least one won bettor as a winning pick when at least one of the plurality of sporting contests ends in a tie.

14. The sports betting system of claim 9 wherein the bet processing module rejects the at least one of the plurality of sports bets if the plurality of sports bettors submits the plurality of sports bets after, the commencement of the plurality of sporting contests.

15. The sports betting system of claim 9 wherein the communication device is selected from a group consisting of: a smart phone, a laptop, a personal computer, a tablet computing device, digital media communication device, and any future communication device.

16. A non-transitory computer-readable medium having computer-readable program code embodied therein which when executed by a computer having a processor and a memory unit causes the computer to perform the following steps:

(a) accessing the daily up to top fifty websites' information of the betting odds on sports contests for pro football, college football, pro baseball, pro hockey, pro soccer, pro basketball, and college basketball, and sports betting information;

(b) storing the daily up to top fifty websites' information of the betting odds on sports contests for pro football, college football, pro baseball, pro hockey, pro soccer, pro basketball, and college basketball, and sports betting information;

(c) calculating the weighed aggregate average daily betting odds on sports contests of pro football, college football, pro baseball, pro hockey, pro soccer, pro basketball, and college basketball based on current available informational input, runs may be used for baseball, goals may be used for soccer and hockey, points maybe used for basketball and football, and dollars maybe used for all of the above-mentioned sports betting categories;

(d) storing the weighed aggregate average daily betting odds on sports contests of pro football, college football, pro baseball, pro hockey, pro soccer, pro basketball, and college basketball based on current available informational input;

(e) calculating for all possible permutations and combinations of future individual counts, for the daily payouts based on current available informational input from the up to top fifty sports betting websites' sports contests betting odds, dollars, points, runs, and goals, and other sports betting information for retail customers;

(f) calculating for all possible permutations and combinations of individual counts, for the daily payouts based on current available informational input from the up to top fifty sports betting websites' sports contests betting odds, dollars, points, runs, and goals, and other sports betting information for clients;

(g) prioritizing the most profitable count offerings daily for retail customers;

(h) prioritizing the most profitable count offerings daily for clients;

(i) recommending the most profitable count offerings daily for retail customers;

(j) prioritizing and selecting all of those future sports contests daily pro football, college football, pro baseball, pro hockey, pro soccer, pro basketball, and college basketball for the various counts for retail customers that are the most competitively calculated weighed aggregate averages, which have the smallest number of points, dollars, runs, or goals separating the favored sports teams from the underdog sports teams;

(k) recommending the most profitable count offerings daily for clients;

(l) prioritizing and selecting all of those future sports contests daily for the various counts for clients that are the most competitively calculated weighed aggregate averages, which have the smallest number of points, dollars, runs, or goals separating the favored sports teams from the underdog sports teams;

(m) proposing varied counts of sports contests which may vary for retail customers and clients;

(n) proposing a number of selectable sports contests in the varied counts to retail customers and clients, that may be different and may often exceed the number of mandatory required sports contests picks for that count;

(o) proposed daily counts of sports contests with their payouts will be transmitted to retail customers;

(p) proposed daily counts of sports contests with their payouts will be transmitted to clients;

(q) selecting at least one sporting category by a plurality of sports bettors utilizing a web based betting platform installed on an electronic device;

(r) selecting a plurality of sporting contests from the at least one sporting category by the plurality of sports bettors, each of the plurality of sporting contests includes a plurality of sports teams;

(s) determining a count of daily contests, the number of selectable groups of sports contests, to be conducted on a specific day by each of the plurality of sports bettors;

(t) placing a plurality of sports bets by selecting at, least one of the plurality of sports teams as a winning team in each of the plurality of sporting contests by the plurality of sports bettors;

(u) storing the at least one sporting category, the plurality of sporting contests, the count of daily contests selected by the plurality of sports bettors and the plurality of sports bets at a sports betting database in the memory unit via a network;

(v) submitting the plurality of sports bets placed by each of the plurality of sports bettors to a bet processing module at the processor via the web based betting platform by the plurality of sports bettors before the Commencement of the plurality of sporting contests;

(w) accepting the plurality of sports bets by the bet processing module;

(x) informing results of the plurality of sports teams to the plurality of sports bettors after the completion of the plurality of sporting contests via the network;

(y) retrieving the plurality of sports bets submitted by the plurality of sports bettors from the sports betting database;

(z) comparing the results of the plurality of sports teams with the plurality of sports bets submitted by each of the plurality of sports bettors;

(aa) selecting at least one of the plurality of sports bettors as a won bettor when the at least one of the plurality of sports teams in each of the plurality of sports contests selected by the at least one of the plurality of sports bettors at step (z) has won in the plurality of sporting contests;

(bb) however, allowing in sporting contests of pro soccer, where the result of the sporting contest is a tie and the plurality of sports bettors pick the contest to end in a tie, the tie pick will be considered a winning pick;

(cc) providing rewards to the at least one won bettor via the web based betting platform; and (dd) performing at least one action to, at least one non-winning bettor in the plurality of sports bettors by the bet processing module;

whereby the bet processing module provides an opportunity for the plurality of sports bettors to earn higher payoffs through the selection of a multiple number of winning teams in the plurality of sporting contests.

17. The non-transitory computer-readable medium of claim 16 wherein the at least one action at step (dd) includes rejecting payments to the at least one non-winning bettor when the plurality of sports teams selected by the at least one non-winning bettor did not win in the plurality of sporting contests.

18. The non-transitory computer-readable medium of claim 16 allows the plurality of sports bettors to select the plurality of sporting contests from the at least one sporting category.

19. The non-transitory computer-readable medium of claim 16 wherein the web based betting platform selects the at least one of won bettor without any handicapping points, goals, runs, or dollars.

20. The non-transitory computer-readable medium of claim 16 wherein the bet processing module declares the selection of the at least one won bettor as incorrect when at least one of the plurality Of sporting contests ends in a tie.

21. The non-transitory computer-readable medium of claim 16 wherein the communication device is selected from a group consisting of: a smart phone, a laptop, a personal computer, a tablet computing device and a hand-held digital media communication device.

* * * * *